(12) United States Patent
Todorovic et al.

(10) Patent No.: US 9,371,778 B2
(45) Date of Patent: Jun. 21, 2016

(54) ENGINE CASING OF AN AIRCRAFT GAS TURBINE HAVING SOUND-ABSORBING ELEMENTS IN THE FAN INFLOW REGION

(71) Applicant: Rolls-Royce Deutschland Ltd & Co KG, Blankenfelde-Mahlow (DE)

(72) Inventors: Predrag Todorovic, Berlin (DE); Thomas Kubisch, Koenigs Wusterhausen (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 802 days.

(21) Appl. No.: 13/743,017

(22) Filed: Jan. 16, 2013

(65) Prior Publication Data

US 2014/0064928 A1 Mar. 6, 2014

(30) Foreign Application Priority Data

Jan. 26, 2012 (DE) .......................... 10 2012 001 571

(51) Int. Cl.

| F03D 11/00 | (2006.01) |
| F02C 7/24 | (2006.01) |
| F02K 1/82 | (2006.01) |
| F02C 7/045 | (2006.01) |
| F02K 3/06 | (2006.01) |
| B64D 33/02 | (2006.01) |

(52) U.S. Cl.
CPC . *F02C 7/24* (2013.01); *B64D 33/02* (2013.01); *F02C 7/045* (2013.01); *F02K 1/827* (2013.01); *F02K 3/06* (2013.01); *B64D 2033/0206* (2013.01); *Y02T 50/672* (2013.01)

(58) Field of Classification Search
CPC ........ F01D 25/04; F02C 7/24; F05D 2260/96

USPC .......................................................... 415/119
See application file for complete search history.

(56) References Cited

U.S. PATENT DOCUMENTS

| 5,498,127 | A | 3/1996 | Kraft et al. |
| 5,997,985 | A | 12/1999 | Clarke et al. |
| 2002/0141859 | A1* | 10/2002 | Sathianathan et al. ............ 415/9 |
| 2003/0156940 | A1 | 8/2003 | Czachor et al. |
| 2010/0236862 | A1 | 9/2010 | Sternberger et al. |
| 2010/0284789 | A1* | 11/2010 | Brooks et al. .................. 415/119 |

FOREIGN PATENT DOCUMENTS

| DE | 69528512 | 6/2003 |
| SU | 2297369 | 11/2005 |
| WO | WO 2011034469 A1 * | 3/2011 |

OTHER PUBLICATIONS

German Search Report dated Nov. 19, 2012 from counterpart application.

* cited by examiner

Primary Examiner — Dwayne J White
Assistant Examiner — Jason Mikus
(74) Attorney, Agent, or Firm — Timothy J. Klima; Shuttleworth & Ingersoll, PLC

(57) ABSTRACT

The present invention relates to an engine casing of an aircraft gas turbine having a radially inner honeycomb-structured layer arranged on the engine casing in the flow direction upstream of a fan in the area of an inflow-side air inlet, characterized in that sound-absorbing elements are arranged radially outside at least one axial section of the honeycomb-structured layer, said elements extending in the axial direction and being arranged annularly next to one another in the circumferential direction.

8 Claims, 5 Drawing Sheets

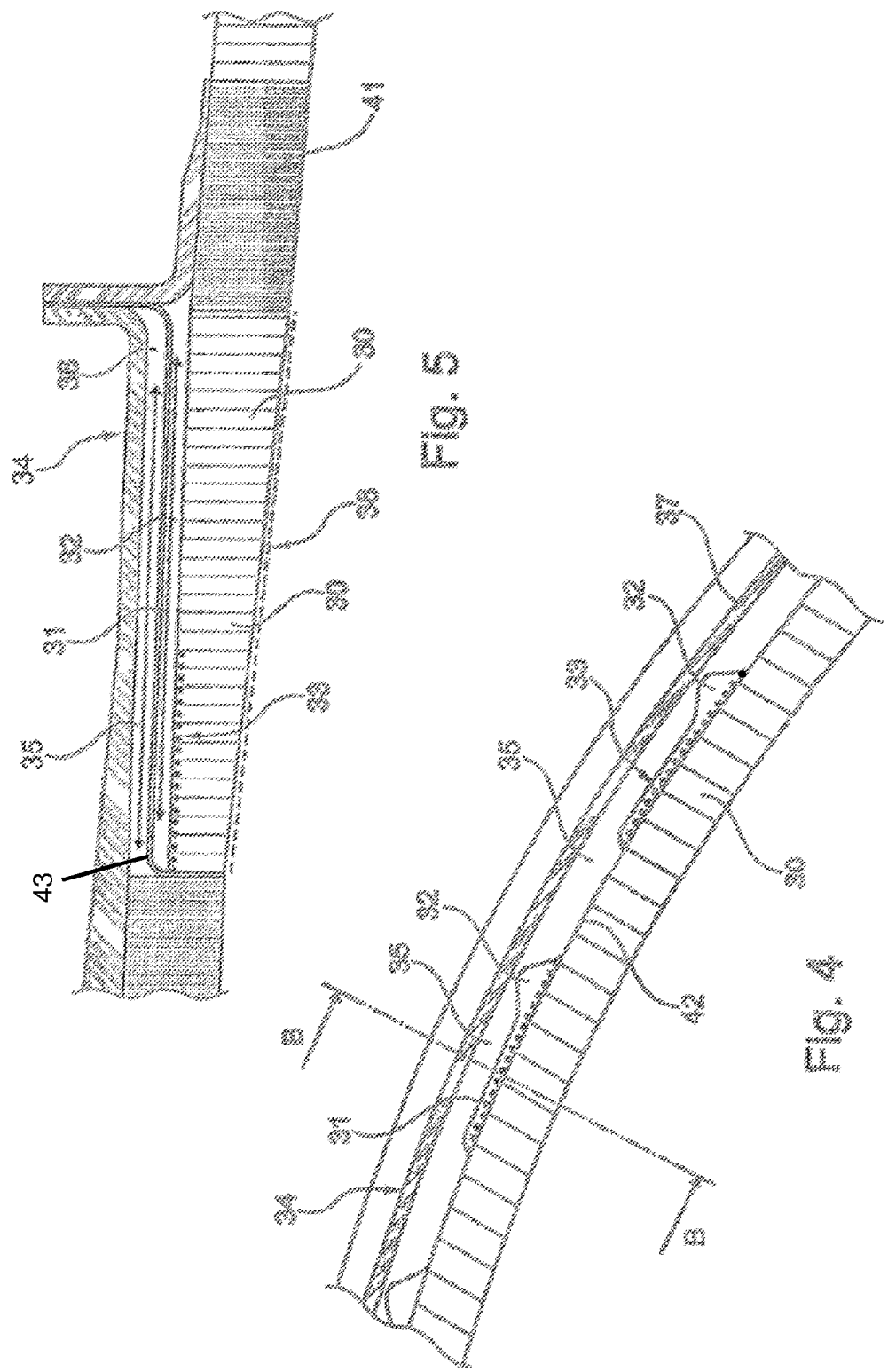

Figure 1:
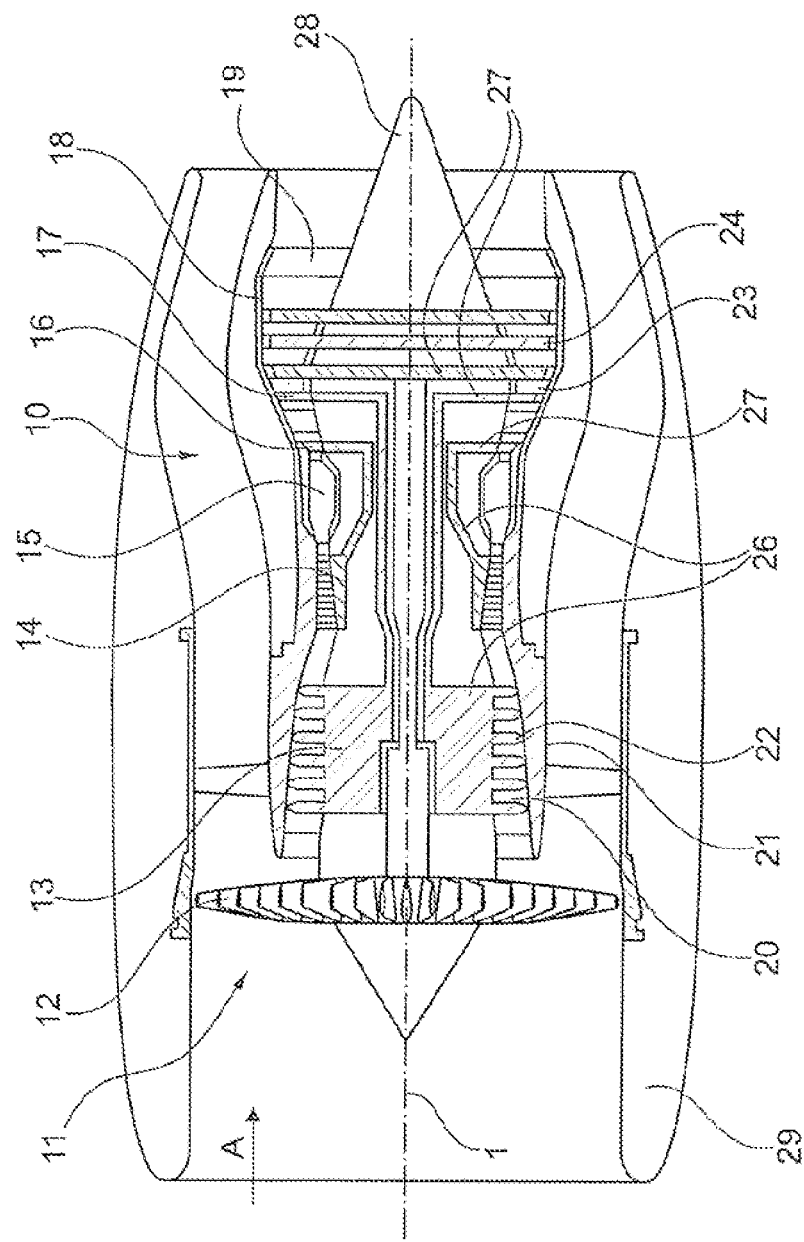

ENGINE CASING OF AN AIRCRAFT GAS TURBINE HAVING SOUND-ABSORBING ELEMENTS IN THE FAN INFLOW REGION

This application claims priority to German Patent Application 102012001571.2 filed Jan. 26, 2012, the entirety of which is incorporated by reference herein.

This invention relates to an engine casing of an aircraft gas turbine and specifically to an aircraft gas turbine having a honeycomb-structured layer facing in the flow direction upstream of a fan radially inwards to an air inlet duct. The honeycomb-structured layer is designed with webs facing radially outwards in the form of a honeycomb, thus having a plurality of chambers. The latter are connected by recesses, for example in the form of a micro-perforation, to the air inflow region, in order to achieve in this way noise absorption. The honeycombs of the honeycomb-structured layer, which is made for example of metal or a composite material, form $\lambda/4$ absorbers.

In the designs known from the state of the art, an outer fan casing forms, together with the honeycomb structure, a structural unit. The design necessitates making the noise-absorbing structure, formed by the honeycomb-structured layer, in two or more parts in order to be in a position to fit the entire arrangement. The result is that the noise-absorbing arrangement is limited in terms of the installation space available and is hence particularly unsuitable for damping of low frequencies.

A broad aspect of the present invention is to provide an engine casing having sound absorption properties of the type specified at the beginning which, while being simply designed and easily and cost-effectively producible, enables optimum sound absorption, in particular of low frequency noise.

It is a particular object of the present invention to provide solution to the above problematics by a combination of the features described herein. Further advantageous embodiments of the present invention become apparent from the present description.

It is thus provided in accordance with the invention that additional sound-absorbing elements are arranged radially outside at least one axial section of the honeycomb-structured layer, said elements extending in the axial direction and being arranged annularly next to one another in the circumferential direction.

An additional sound-absorbing unit is thus formed in accordance with the invention in which the sound-absorbing elements are optimized due to their axial length for damping of low frequency noise. The sound-absorbing elements are arranged at an intermediate area between an inlet casing (part of the engine casing) and a fan casing. This permits the use of a longer axial area for sound absorption, and arrangement of the sound-absorbing elements such that they extend into an axial area of the fan casing. With this design, the honeycomb-structured absorbing elements known from the state of the art can be designed such that they are not subdivided in the axial direction and can hence provide effective sound absorption. A further advantage of the design in accordance with the invention is that it can be used without major design changes in existing engine casing structures (the term engine nacelle can also be used instead of engine casing).

It is thus possible to arrange the known honeycomb-structured layers up to the transition to the fan casing, and hence design them with a large axial length. The fan casing can accordingly be provided in accordance with the invention with a larger flange diameter to provide space for installing the sound-absorbing elements in accordance with the invention for damping lower frequencies.

Due to the embodiment in accordance with the invention and to the combination of the honeycomb-structured layer with the sound-absorbing elements in accordance with the invention, both $\lambda/4$ resonators and Helmholtz resonators can be designed. Since low-frequency noise is transmitted non-directionally, the arrangement in accordance with the invention and the embodiment of the sound-absorbing elements proves to be particularly effective.

In a favourable development of the invention, it is provided that each sound-absorbing element has at least one hollow chamber extending substantially in the axial direction and connected via recesses to the honeycomb-structured layer. The hollow chamber is thus used for damping low-frequency noise and permits, as mentioned above, a large volume and "big depth" required by $\lambda/4$ principles.

In a preferred embodiment of the invention, the sound-absorbing elements are arranged in a fan casing surrounding them radially on the outside, as already set forth above. With this arrangement and embodiment, an optimized overall structure is obtained which is simple and inexpensive to manufacture.

In order to improve in particular the damping of low-frequency vibrations, it is particularly advantageous when the sound-absorbing elements are radially remote from the fan casing and/or the honeycomb-structured layer and at least partly form an intermediate chamber. It is particularly favourable here when the sound-absorbing element is provided with at least one recess for connecting the intermediate chamber to the hollow chamber. This ensures an effective sound wave introduction into the absorbing element.

It has proven particularly advantageous, in accordance with the invention, when several sound-absorbing elements are arranged in the circumferential direction in order to limit the individual intermediate chambers and hollow chambers. It is advantageous here when the sound-absorbing element has at least one sealing rib extending in the axial direction and designed in the radial direction such that it is contacting the fan casing.

In accordance with the invention, therefore, a three-dimensional absorbing structure is created by the sound-absorbing elements, which can be made of a metallic material or of composite material. A structural adaptation to the design situation of existing structures is made possible in a simple manner.

It is provided in accordance with the invention that the radially outer wall of the honeycomb-structured layer is provided with recesses, for example in the form of a micro-perforation, in order to pass low-frequency noise into the intermediate chamber or the hollow chamber. These sound waves are diverted in the sound-absorbing elements in accordance with the invention and routed in a labyrinth-type manner inside the sound-absorbing element, said sound waves (noise) being passed through the recess for connecting the intermediate chamber to the hollow chamber. The reflected sound waves (noise) then assume the same propagation path. This leads to a very efficient and effective sound absorption.

The sound-absorbing elements in accordance with the invention can furthermore be advantageously designed such that they can be used as force-transmitting structural elements.

Overall, the result is a very simply designed structure having a low weight and making optimum use of the available installation space. This results in a maximization of the possible sound absorption effect, which in turn leads both to better running characteristics of the fan and to a better load distribution.

Figure 2:
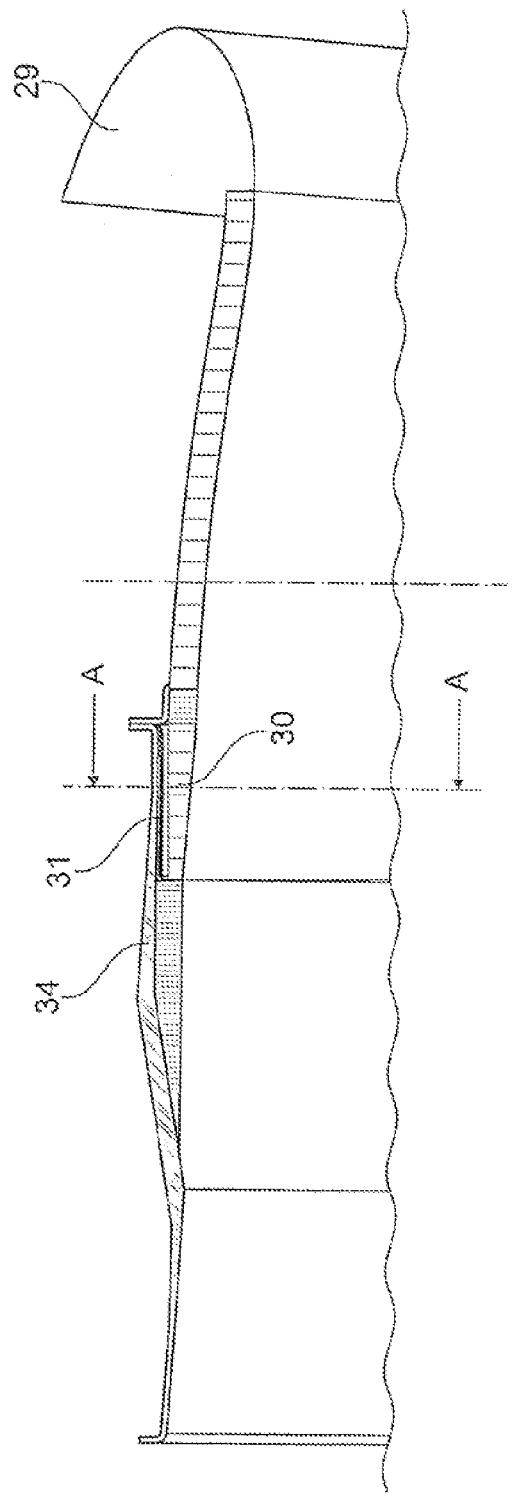
Figure 3:
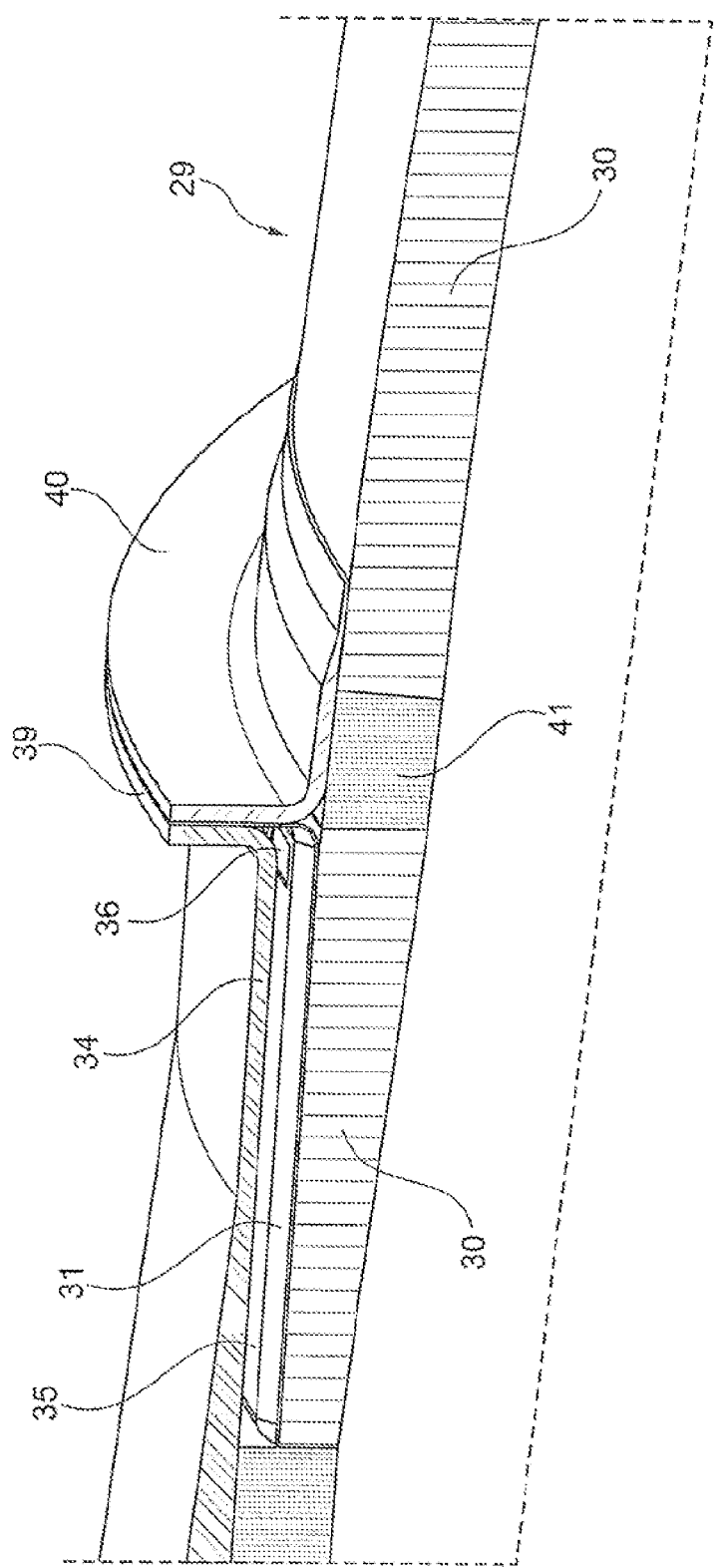
Figure 6:
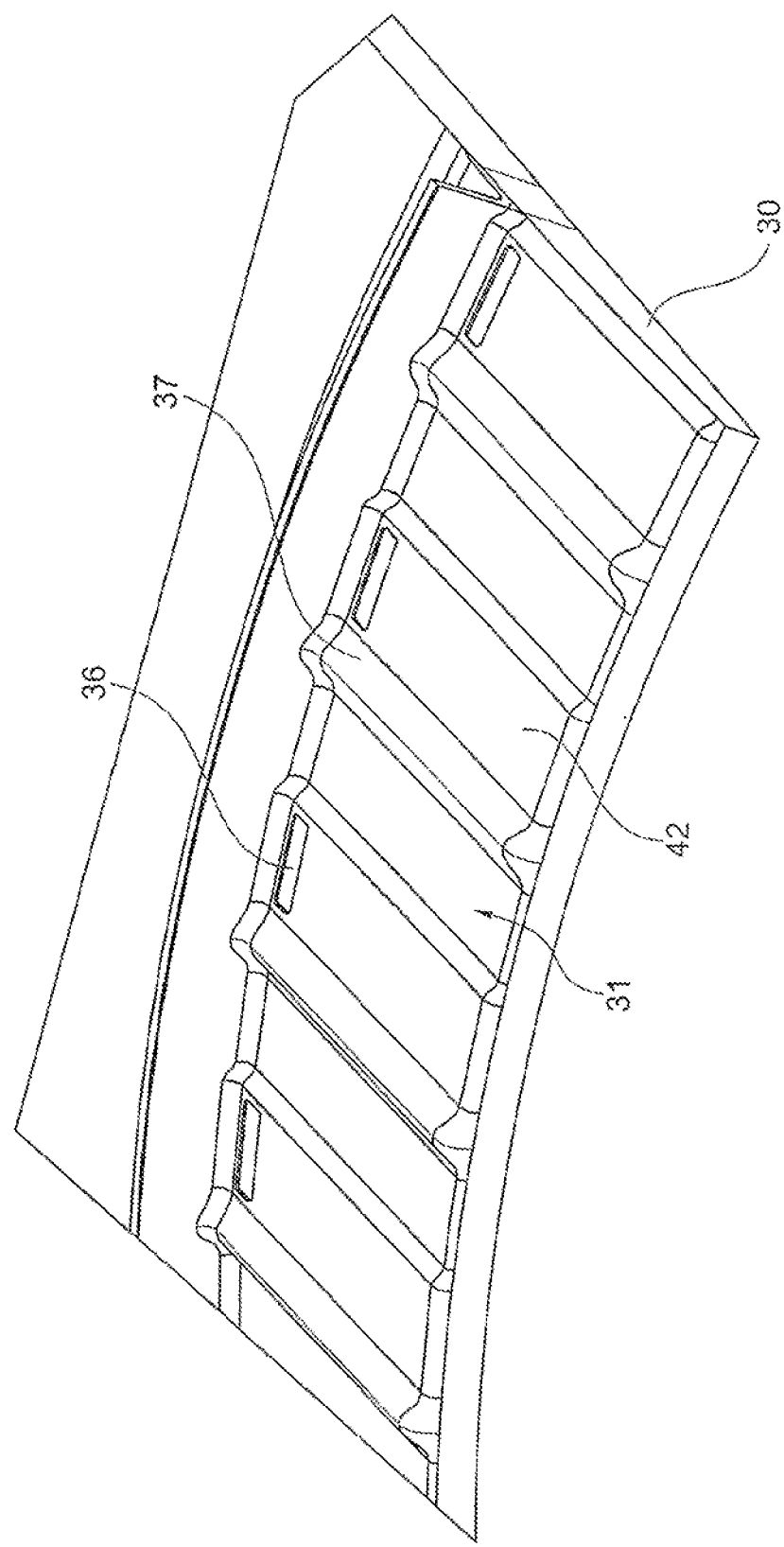

The present invention is described in the following in light of the accompanying drawing, showing an exemplary embodiment. In the drawing, FIG. 1 shows a schematic representation of a gas-turbine engine in accordance with the present invention, FIG. 2 schematically shows a simplified axial partial sectional view, FIG. 3 shows an enlarged detail view according to FIG. 2, FIG. 4 shows a sectional view along line A-A of FIG. 2, FIG. 5 shows a sectional view along line B-B of FIG. 4, and FIG. 6 shows a perspective partial representation of the sound-absorbing elements in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation. Reference numeral 28 shows an exhaust cone.

FIG. 2 shows a schematic partial representation of an engine casing 29 in accordance with the invention, where the flow comes from the right according to FIG. 2.

FIG. 3 shows an enlarged detail view according to FIG. 2. It can be seen here that a honeycomb-structured layer 30 is formed on the radially inner area of the engine casing 29 facing the air inlet 11. The honeycomb-structured layer has a micro-perforation or recesses 38 (see FIG. 5) through which sound waves can enter the honeycomb-structured layer 30.

FIG. 3 furthermore shows a fan casing 34 connected by means of a flange 39 to a flange 40 of the engine casing 29. A honeycomb structure 41 with high density or strength is provided in the area of the flange 40.

In the area of the fan casing 34, a sound-absorbing element 31 is shown radially outside the honeycomb-structured layer 30 in FIG. 3. The structure of the sound-absorbing element 31 is explained in detail in FIGS. 4 to 6.

As FIG. 6 shows, several sound-absorbing elements 31 are arranged next to one another in the circumferential direction. These elements are provided in the radial direction with different height ranges and each have at their rim areas a sealing rib 37 contacting the fan casing 34. As FIG. 5 shows, a radially outer intermediate chamber 35 and a radially inner hollow chamber 32 are formed in each case. A wall 43 of the hollow chamber 32 separates the hollow chamber 32 from the intermediate chamber 35 except where they are connected to one another by an interconnecting passage, recess 36. The radially outer side of the honeycomb-structured layer 30 has recesses 33, for example in the form of a micro-perforation. This allows sound waves to enter the honeycomb-structured layer 30 through the recesses/ micro-perforations 38 and to pass from there into the hollow chamber 32. From the latter, the sound waves pass through the recess 36 into the intermediate chamber 35. The labyrinthine structure already mentioned is thus obtained.

FIG. 6 shows that different areas are provided on the respective sound-absorbing element 31 in the circumferential direction. The area provided with the recess 36 is shown in FIG. 5 and forms the hollow chamber 32 and the intermediate chamber 35. Adjacently hereto, an area 42 (see also FIG. 4) is provided which directly contacts the honeycomb-structured layer 30. The result is an asymmetrical embodiment of the intermediate chamber 35 which leads to an optimization of the sound absorption.

LIST OF REFERENCE NUMERALS

1 Engine axis
10 Gas-turbine engine
11 Air inlet
12 Fan
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Engine casing/engine nacelle
30 Honeycomb-structured layer
31 Sound-absorbing element
32 Hollow chamber
33 Recess/micro-perforation
34 Fan casing
35 Intermediate chamber
36 Recess
37 Sealing rib
38 Micro-perforation/recess
39 Flange
40 Flange
41 Honeycomb structure
42 Area

What is claimed is:
1. An engine casing assembly of an aircraft gas turbine comprising:
a fan casing;
a radially inner honeycomb-structured layer arranged on the fan casing in a flow direction upstream of a fan in an area of an inflow-side air inlet, the honeycomb-structured layer including a plurality of chambers;

sound-absorbing elements arranged radially outside at least one axial section of the honeycomb-structured layer, the elements extending in an axial direction and being arranged annularly next to one another in a circumferential direction;

an intermediate chamber having a first end and a second end, the intermediate chamber extending substantially in the axial direction between the first end and the second end and having a first length extending between the first end and the second end;

each sound-absorbing element including:
- a hollow chamber having a third end and a fourth end, the hollow chamber extending substantially in the axial direction between the third end and the fourth end and having a second length extending between the third end and the fourth end;
- a wall separating the hollow chamber and the intermediate chamber;
- an interconnecting passage connecting the fourth end to the second end to increase a tuned length of the sound-absorbing element to a length including both the first length and the second length;
- recesses connecting the chambers of the honeycomb-structured layer to the hollow chamber;
- wherein the chambers of the honeycomb-structured layer connect to the intermediate chamber only via the hollow chamber and the interconnecting passage.

2. The engine casing assembly in accordance with claim 1, wherein the sound-absorbing elements are arranged in the fan casing with the fan casing radially outwardly surrounding the sound-absorbing elements.

3. The engine casing assembly in accordance with claim 1, wherein the sound-absorbing elements are radially remote from at least one chosen from the fan casing and the honeycomb-structured layer.

4. The engine casing assembly in accordance with claim 1, wherein at least one of the sound-absorbing elements in the circumferential direction includes at least one sealing rib contacting the fan casing.

5. The engine casing assembly in accordance with claim 4, wherein the sound-absorbing elements are radially remote from at least one chosen from the fan casing and the honeycomb-structured layer.

6. The engine casing assembly in accordance with claim 2, wherein the sound-absorbing elements are radially remote from at least one chosen from the fan casing and the honeycomb-structured layer.

7. The engine casing assembly in accordance with claim 6, wherein at least one of the sound-absorbing elements in the circumferential direction includes at least one sealing rib contacting the fan casing.

8. The engine casing assembly in accordance with claim 2, wherein at least one of the sound-absorbing elements in the circumferential direction includes at least one sealing rib contacting the fan casing.

* * * * *